W. HAGERTY.
Constructing Boat Hulls.
No. 79,114.
Patented June 23, 1868.
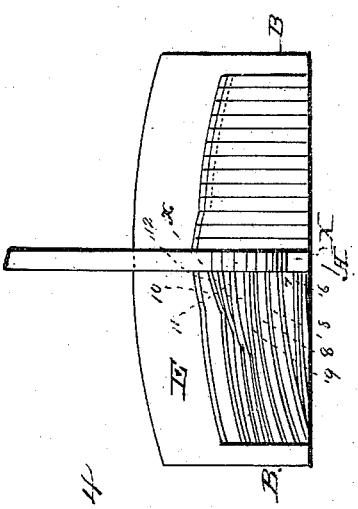
Fig. 4.
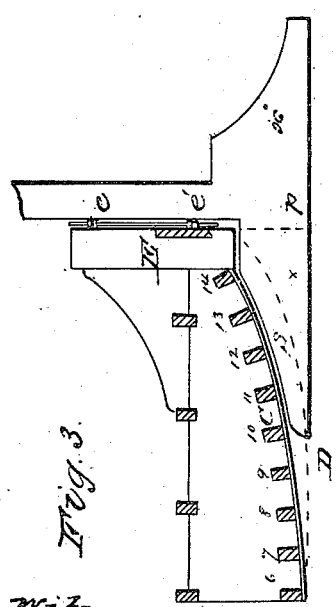
Fig. 3.
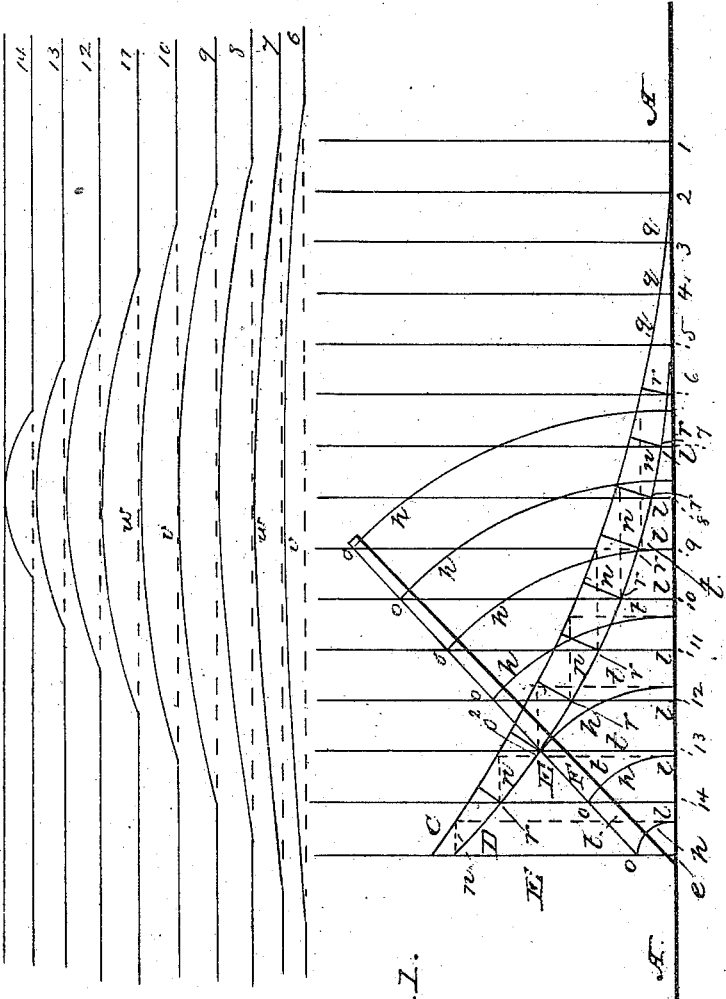
Fig. 2.
Fig. 1.
Witnesses
James J. Johnston
James E. Weaver
Inventor
Wm Hagerty

United States Patent Office.

WILLIAM HAGERTY, OF MONONGAHELA, PENNSYLVANIA.

Letters Patent No. 79,114, dated June 23, 1868.

IMPROVEMENT IN HULLS OF STEAMBOATS.

*The Schedule referred to in these Letters Patent and making part of the same.*

TO ALL WHOM IT MAY CONCERN:

Be it known that I, WILLIAM HAGERTY, of Monongahela city, in the county of Washington, and State of Pennsylvania, have invented a new and useful Improvement in the Manner of Draughting the Timbers for the Hulls of Steamboats and other vessels; and I do hereby declare the following to be a full and exact description thereof, reference being had to the accompanying drawings, and to the letters and figures of reference marked thereon.

The nature of my invention consists in constructing the recess in the stem of the hull of vessels, (but more particularly those of steamboats,) for the reception of a balanced rudder, upon strictly geometrical principles, as hereinafter set forth, whereby I am enabled to work out my timbers in the yard, and put them up in frame without the risk of their being wrong, or the necessity of cutting them to the proper shape after being in place.

To enable those skilled in the art of naval architecture to construct the hulls of vessels upon my improved method, I will proceed to describe the manner of its application.

In the accompanying drawings—

Figure 4 is an end view of a steamboat-hull, one half of which is planked, and the other half showing the shape of the timbers.

Figure 3 is a longitudinal section of a steamboat-hull, showing a balance-rudder in position, and the shape of the recess in the hull to receive it.

Figure 2 is an end skeleton view of the timbers, showing the height and length of the curve of each.

Figure 1 is a geometrical combined plan and elevation, showing the manner of finding the height and length of the curves shown in fig. 2, and the rake of the hull and sweep of the rudder.

In the drawings, A, fig. 1, is the centre line, or a line drawn through the centre of the hull from stem to stern. B, fig. 4, is the skeg or dead-wood. The lines marked 12, 13, &c., figs. 3 and 4, represent the bottom timbers of the boat, and are shown and marked the same in figs. 3 and 4. C, fig. 1, is the rake of the hull at the centre of the boat, at the line A, fig. 4, and D, fig. 3, is the rake at the side of the boat, on the "skeg" B, fig. 4. The outline of the "skeg" B is shown in fig. 3 by the dotted line $p$, and the rake upon the "skeg" is shown by the dotted line $s$. $e'$ $e'$, figs. 1 and 3, are hinges or centres, upon which the rudder swings.

The manner of constructing the diagram shown in fig. 1 is as follows:

First draw the line A indefinitely, and upon it take the point $e$, which will be the centre, upon which the rudder swings upon the line A from the point $e$; set off the distance from the point $e$ to the transom E, which will vary according to the size of the rudder-hinges; and from the transom set off upon the line A the points 14, 13, 12, &c., and erect indefinite perpendiculars therefrom, and next draw the line C, representing the rake at the centre of the boat, and which is always regulated in accordance with the taste and judgment of the owner or builder. Next draw the line F from the point $e$, extending it to the required angle, and at the required length to the line A, which is also a matter of taste, and from it set off the line E equal to half the thickness of the rudder. Now, from the points $o$, where the line E' cuts the perpendiculars 14, 13, 12, &c., with $e$ as a centre, and a radius equal to the distance from the point $e$ to each of the points $o$, describe the arcs $h$ $h$, &c., producing them to the line A at the points $l$ $l$. These lines show the sweep of the rudder when in its proper position on the boat. From the points $l$ $l$ erect the perpendiculars, dotted lines $t$ $t$, producing them to the centre rake C. From the points at which they cut the rake, draw the dotted lines $n$ $n$, &c., parallel to the line A, extending each one to the perpendicular's numbered line from which the arc starts. For instance, it will be observed that the largest arc, $h$, starts from the points $o$ on the perpendicular line 9, and it will also be observed that the dotted line $n$, which starts at the first where the arc crosses the rake C, is produced until it meets the perpendicular line 9, and so with all the other arcs. The intersection of the lines 14, 13, 12, &c., will give the points $r$, through which the line D is drawn, and which represents the rake of the hull at the extremity of the rudder-sweep. After drawing the line D through the points of intersection of the lines 14, 13, 12, &c., and the dotted lines $n$ $n$, &c., draw a line at right angles to the line D, starting at the point $r$, and extending it to the line C. This will give the height of the curve of each respective timber shown in fig. 2, between the points *v, w,* &c., when said timbers are set at right angles to the line D. Twice the distance between the points *l l* upon the line A, and points *o o* upon the perpendicular lines 14, 13, 12, &c., will be the length of the curve of the timbers in fig. 2, each distance being transferred from fig. 1 to its respective numbered line in fig. 2.

Where the rake begins at the base-line, there are a few timbers which are set at right angles to the line A in the keel of the boat. The height of the curve of these will be the distance between the lines C and D, measured at right angles to the base-line A, fig. 1, and marked *q*.

The advantages of my manner of constructing the hulls of steamboats upon geometrical principles, so that that I am enabled to make a more perfect fit of the hull to the rudder when it swings around at any angle, and whereby I am enabled to accomplish the same with a saving of both time and labor, will be apparent to every boat-builder; and as the description and drawings will readily be understood by the intelligent workman, and believing myself to be the first inventor of the above-described method, and having thus described my invention, and the manner of applying it to use,

What I claim, is—

The geometrical system or rule as illustrated in fig. 1 of the drawings, for draughting the cross-timbers so as to form a segment of a conoid in the hulls of vessels, substantially as set forth and described.

WM. HAGERTY.

Witnesses:
JAMES McBRIDE,
JAMES J. JOHNSTON.